May 13, 1958   S. P. KELLOGG 2ND   2,834,957
NAVIGATIONAL AID FOR DIRIGIBLE CRAFT
Filed Sept. 29, 1952   3 Sheets-Sheet 2

INVENTOR
SPENCER KELLOGG, 2ND
BY
ATTORNEY

May 13, 1958

S. P. KELLOGG 2ND 2,834,957

NAVIGATIONAL AID FOR DIRIGIBLE CRAFT

Filed Sept. 29, 1952

INVENTOR
SPENCER KELLOGG, 2ND
BY
ATTORNEY

United States Patent Office 2,834,957
Patented May 13, 1958

2,834,957

NAVIGATIONAL AID FOR DIRIGIBLE CRAFT

Spencer Kellogg 2nd, Glen Head, N. Y., assignor to Sperry Rand Corporation, a corporation of Delaware Application September 29, 1952, Serial No. 312,024

11 Claims. (Cl. 343—107)

My invention relates to improvements in navigational aids for dirigible craft to enable the craft to be steered manually or automatically to travel toward and pursue a given flight path. More particularly, the present invention concerns navigational aids of this kind wherein a control quantity is derived from a combination of quantities representing different conditions of operation of the craft. Such quantities, for example, may include a displacement quantity substantially equivalent to the lateral displacement of the craft from a given flight path, a rate quantity substantially equivalent to the angular departure in the heading attitude of the craft in relation to the direction of the flight path, and an acceleration quantity substantially equivalent to the angular departure in the roll attitude of the craft from a reference roll attitude.

Flight paths that the craft may be controlled to travel toward and ultimately pursue may be defined by their altitude, in which event the lateral displacement of the craft from the path so defined may be measured by altitude sensing means such as barometric and radio altimeters or by radio beams, such as ILS (Instrument Landing System) beams, omnidirectional beams and the like, the displacement of the craft from these beams being measured by means such as localizer receiver means, visual omni-range receiver means, and glide slope receiver means.

In applying a navigational aid of the foregoing nature to an automatic control system, the control quantity is employed to actuate an appropriate device such as a rudder, aileron or the like, to control the craft automatically to travel toward and pursue the radio-defined path. An example of such an automatic control is disclosed in S. N. 726,605, now U. S. Patent 2,613,050, dated October 7, 1952, entitled "Blind Landing Indicator and Controller for Aircraft," filed February 5, 1947, in the name of O. E. Esval. On the other hand, in applying such a navigational aid to a manual control system, the control quantity is employed to actuate a suitable indicating device such as, for example, a cross-pointer meter. By an arrangement of the latter character, the operator controls the craft so as to obtain a zero reading on the indicator, thereby turning the craft in the proper direction for traveling toward and along the radio-defined path. An example of such a manual control or indicating system is disclosed in S. N. 128,227, now U. S. Patent 2,613,352, dated October 7, 1952, entitled "Control System," filed November 18, 1949, in the name of the present inventor.

In the aforesaid type of indicating system, displacement, heading, and roll quantities are represented by signals which are algebraically combined in a summing amplifier whose output is connected to operate the indicator. Upon the craft being displaced laterally from the radio-defined path, the indicator is actuated to indicate to the operator that a bank angle or turn rate or change in heading is required. The operator then banks and turns his craft toward the radio-defined path in accordance with the sense of the displacement signal, thereby producing an opposing rate signal due to the heading change and an opposing acceleration signal since a change in roll attitude usually accompanies the heading change. The operator adjusts the roll of the craft continuously so that the algebraic sum of the displacement, rate and acceleration signals equals zero, as evidenced by a zero reading on the indicator. By an arrangement of this nature, the operator is enabled to control his craft to approach the radio-defined path in an asymptotic manner by merely controlling bank angle to thereby maintain a zero reading on the indicator.

The asymptotic approach is effected similarly, but automatically, where the control quantity is employed to operate an automatic control system of the type shown in the aforesaid applicaion Serial No. 726,605.

Where the heading signal increases in a non-linear fashion as the difference between reference and craft headings increases from zero, it is desirable (for maximum sensitivity) to operate about a point where the heading signal increase for a given change in heading is the greatest. Where the heading signal varies as a sinusoid with its origin occurring where the reference and craft headings are the same, said origin defines a point of maximum slope and, therefore, maximum sensitivity. In prior art systems, the heading signal variation is generally sinusoidal and the heading of the radio-defined path or beam usually serves as the reference heading. Hence, in order to intercept the beam, the craft must travel at a heading different from the beam or reference heading. In so traveling, however, the craft operates about a point of decreased slope on the sinusoid and the sensitivity thereabout is less than that at the origin.

In the present invention, instead of algebraically adding the displacement, heading and roll signals in a summing amplifier, I provide means whereby the reference heading is offset or made to differ from the beam heading by an amount dependent on the lateral displacement of the craft from the beam and whereby the craft may be controlled by the heading signal directly. Hence, the craft will be controlled so as to make the heading of the craft the same as the variable reference heading, thereby operating at the origin of the sinusoid and, consequently, at a point of maximum or peak sensitivity notwithstanding the relation of such coincident craft and reference headings to the heading of the beam. Moreover, the datum or reference heading from which the angular departure in heading of the craft is measured to produce a heading or rate signal is preferably limited to vary from a heading which has a preselected maximum difference from the direction of the radio-defined path to an ultimate heading which is coincident with the path direction, said ultimate heading being attained when the craft is aligned with said path. The rate or heading signal thus operated upon may then be algebraically added in a summing amplifier to an acceleration or roll signal to provide a control signal facilitating manual or automatic control of the craft whereby the craft may be caused to intercept and follow the radio-defined path.

Within the scope of my invention, I might also effect an actual variation of the reference value of the acceleration or roll signal in accordance with changes in the magnitude of the output of a summing amplifier in which the displacement and rate signals are algebraically added. Moreover, the datum or reference roll attitude from which the angular departure in roll of the craft is measured to produce a roll or acceleration signal may be limited to vary from a level attitude to an attitude differing a given amount from said level attitude for magnitudes of the algebraic sum of the craft displacement and rate signals which exceed a predetermined maximum value.

In another embodiment of the present invention, I provide means whereby the reference value, against which the rate or heading signal is measured, is varied in accordance with a radio displacement signal and the rate signal is employed as a quantity according to whose magnitude a variation of the reference value of the acceleration or roll signal is effected. Hence, the reference roll attitude may be made to vary in accordance with the rate signal, the latter being measured from a reference heading made to vary in accordance with a signal proportional to the displacement of the craft from a radio-defined path to be traveled.

By the foregoing arrangement, a craft may be controlled to approach a radio-defined path at larger intercept angles and with greater sensitivity than hitherto obtainable with devices of this nature, and finally to enter the path asymptotically. Moreover, by varying the reference roll attitude as set forth, the craft may be controlled to assume roll attitudes substantially steeper than those obtainable in prior art systems of this general character. In addition, an approach may be commenced closer to the transmitter means setting up the radio-defined path, i. e., an aircraft, for instance, may be controlled to begin its approach from a point nearer the landing field and the localizer transmitter thereat. Furthermore, the shortest turn to the approach heading is invariably called for, regardless of the initial heading of the craft. Also, additional time is saved by enabling the craft through use of the present invention to make tighter turns at higher speeds.

The flight paths to be intercepted and flown, whether radio, compass or altitude defined, are herein regarded as having attitudes, which attitudes are those ultimately possessed by the craft when traveling along one or more of said paths. That is to say, the attitude reference defined by an altimeter is an attitude of constant elevation, while the attitude of a localizer-defined flight path or a compass is a handling attitude, and the attitude of a glide slope flight path is the angle said path makes with the landing field runway.

The principles discussed above are not to be construed as being limited in application to the azimuth control of a craft, since they may be applied just as readily to the control of a craft in elevation. For example, a displacement quantity derived from a flight path defining means such as a glide slope receiver or from an altitude sensitive device may be employed to vary the reference attitude against which the pitch attitude of the craft is measured, and the measure of pitch thus obtained may then be placed in controlling relation to the elevation part of the indicator. On the other hand, it may not be deemed necessary to resort to this expedient. In such event, one or the other of the displacement quantities may be algebraically combined with the rate quantity (pitch) in a summing amplifier after the fashion set forth in said Serial No. 128,227.

In view of all of the foregoing, the principal object of my invention is to improve navigational aids for dirigible craft.

Another object is the provision of an aircraft navigational aid adapted to operate at substantially maximum sensitivity notwithstanding the attitude of flight called for by the aid.

Another object is to provide a dirigible craft navigational aid wherein one signal representing lateral displacement of the craft from a given path and another signal representing craft attitude with respect to the path are combined in such a manner that the navigational aid calls for a course intercepting the path and operates at substantially peak sensitivity as the craft travels along the intercept course.

Another object is the provision of means for producing a control signal dependent on the attitude of a dirigible craft as measured from a reference attitude made continuously to differ from the direction of a given flight path by an amount in proportion to the displacement of the craft laterally of the given path.

Another object is to provide means for limiting the amount by which the reference attitude of the foregoing object is made to differ from the direction of the given flight path.

Another object is the provision of a flight indicator system by which an aircraft may be caused to fly on a substantially straight line course toward a given flight path until the lateral displacement of the craft from the flight path reaches a predetermined amount, the craft thereafter being caused to asymptotically intercept the flight path in a non-linear fashion.

With the foregoing and still other objects in view, my invention includes the novel combinations and arrangements of elements described below and illustrated in the accompanying drawings, in which.

Figure 1:
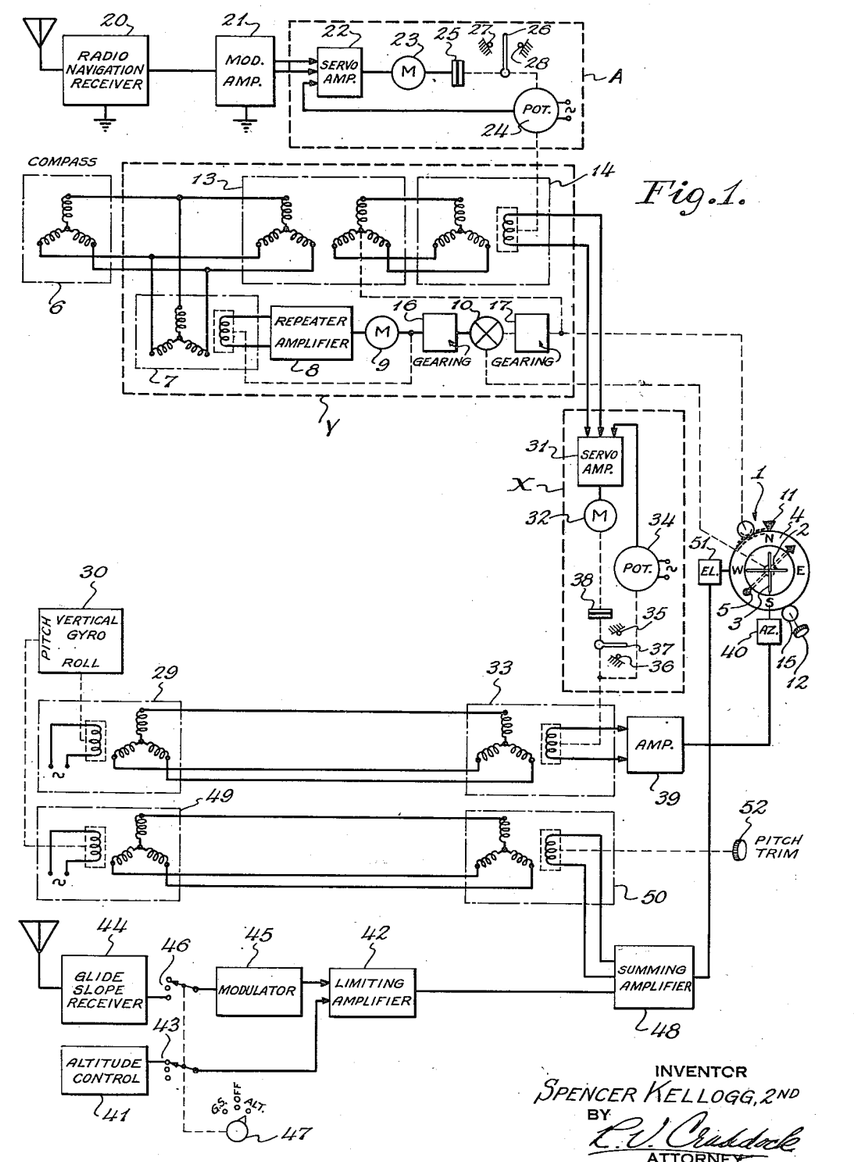
Fig. 1 is an electrical schematic showing a preferred embodiment of my invention in a flight indicator type of navigational aid for aircraft.

In Fig. 1, I have shown my invention embodied preferably in a manual control or indicating control system for aircraft. The indicator 1 is preferably of the combination type wherein a compass repeater and a zero reading cross-pointer meter are combined into a single instrument. The horizontal pointer or bar 2 is for providing an indication to the pilot when a correction in craft elevation is required, while the vertical pointer or bar 3 indicates when a correction in azimuth is required. Both bars are normally in their central or zero reading positions when no corrections in aircraft azimuth and elevation are called for by the present apparatus.

The compass repeater portion of indicator 1 includes a compass card 4 and a pointer 5, the latter being driven in accordance with craft heading as sensed by a compass 6 which is preferably of the magnetically-slaved gyroscopic type. To drive pointer 5 in accordance with craft heading, I have provided a conventional follow-up servo loop preferably comprising a selsyn control transformer 7 having its stator connected to receive heading data from compass 6. Amplifier 8 amplifies the error signal developed in the rotor of transformer 7 and drives a motor 9 to position said rotor thereby to reduce said error signal to zero.

Motor 9 is preferably also connected to drive one input side of a mechanical differential 10, while the other input side of the differential is connected to be driven by a knob 12 adapted to position repeater card 4 with respect to a lubber line 11. The respective input connections of differential 10 may be designed so as to have high mechanical resistance relative to that existing at the output side of the differential; or, alternatively, the input connections may respectively include irreversible means 16, 17 such as a worm and worm wheel, whereby said input connections are rendered incapable of interacting except through said output side. With the inputs to differential 10 thus arranged, I connect the output derived therefrom in driving relation to repeater pointer 5, whereby said pointer is positioned with respect to card 4 in accordance with compass heading irrespective of movements of card 4 brought about by knob 12.

Knob 12 is provided for setting card 4 to an ultimate reference heading which is normally the heading of a radio beam to be flown, and in this regard knob 12 is preferably also connected to position the rotor of a differential selsyn generator 13 electrically disposed between compass 6 and a selsyn control transformer 14. By this arrangement, I obtain a control signal from the rotor of transformer 14 dependent upon the difference between the compass heading and the beam heading normally set on card 4.

The heading of the beam may therefore be regarded as providing a reference heading against which compass or craft heading is compared to produce a control signal proportional to the difference therebetween. But instead of employing this heading signal as such, I choose to modify the signal by effectively offsetting the beam heading setting of card 4 by an amount in proportion to the lateral displacement of the craft from the beam.

Without such an offset of the beam heading setting of card 4 in accordance with the lateral displacement of the craft from the beam, the heading control signal would be zero when the craft is aligned with the heading of the beam, but the craft would not have to intercept the beam-defined path for this condition to obtain. On the other hand, with offset, the heading signal is zeroed when the craft is flown at an intercept heading differing from the beam heading by an amount in proportion to said offset. Therefore, as the offset diminishes with diminishing craft displacement, the amount of difference between the craft and beam headings required to zero the heading signal diminishes so that only for zero displacement, hence zero offset, the heading signal is zeroed when the craft and beam headings are the same. In other words, where the reference or beam heading setting is offset as set forth in accordance with radio displacement, the heading signal varies in such a manner as to be capable of calling for an asymptotic approach to the beam-defined path.

While I may accomplish the foregoing offset operation by connecting card 4 in driven relation to a motor 23 forming part of a conventional servo loop whose input is derived from a radio navigation receiver means 20 such as a standard localizer receiver, I prefer, instead, to employ such a servo loop to position the rotor of transformer 14 to obtain an effect substantially equivalent to an actual offset of card 4. In the aforesaid servo loop, a direct current displacement signal from receiver 20 is fed to a conventional modulator-amplifier 21 whence it is supplied to a suitable servo amplifier 22 in controlling relation to motor 23. A signal generator 24, which may be a potentiometer energized from a suitable source of voltage, is mechanically connected to the output of motor 23 to provide a position feedback signal to amplifier 22 in a wellknown manner. While a linear-type of generator may be employed for this feedback operation, it is to be understood that a non-linear type of generator may be used where improved stability is sought in the servo loop, as will hereinafter be more fully described.

By the foregoing arrangement, transformer 14 is continuously positioned to provide a diminishing offset of reference heading, thereby enabling the craft to be brought asymptotically into the beam-defined path. However, while an asymptotic approach to a radio-defined path from the outer fringes thereof would be satisfactory under some circumstances, it might lead to an overshoot of the landing field in other cases. Hence, by my invention, I cause the craft to fly from the outer fringes of the beam at a predetermined fixed heading in relation to the beam heading until most of the lateral distance to the beam-defined path is closed, after which time the asymptotic approach is commenced.

To accomplish the foregoing operation, I have provided limiting means for preventing transformer 14 from offsetting the reference heading in excess of a predetermined maximum limit. Preferably, the limiting means comprise spaced stops 27, 28 cooperating with a rotatable arm 26 therebetween forming part of the connection between motor 23 and the rotor of transformer 14. A slip-clutch 25 also forms part of said connection and is placed adjacent the motor side of arm 26 whereby stops 27, 28 do not interfere with the normal functioning of motor 23, but prevent the rotor of transformer 14 from being rotated beyond a given extent.

By so limiting the rotation of the rotor of transformer 14, I thereby limit the maximum amount of offset effected upon the reference heading to a value determined by the spacing of stops 27, 28. Hence, so long as the localizer displacement signal is large enough to maintain arm 26 against one or the other of stops 27, 28, the heading reference offset will be constant at its maximum value, and the heading signal will zero out with the craft on a straight-line, fixed intercept heading corresponding to said constant value of offset. However, when the displacement of the craft from the beam-defined path has diminished to the extent that motor 23 gradually begins to drive arm 26 off the stop and the rotor of transformer 14 is gradually restored to its neutral position, the heading reference offset will thereby be gradually reduced until it reaches its zero value at zero displacement of the craft from the beam-defined path. Hence, from the point where the displacement signal ceases to be sufficient to maintain arm 26 on one of stops 27, 28, the signal output of the rotor of transformer 14 is such as to be capable of controlling the craft to enter the beam-defined path asymptotically.

Figure 2:
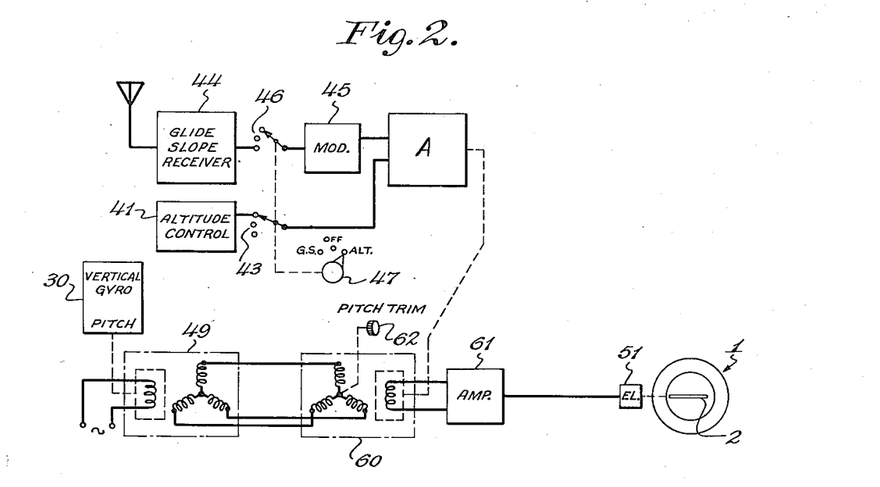
Fig. 2 is an electrical schematic showing my invention embodied in the elevation control portion of the navigational aid.

As noted on Fig. 1, the portion thereof including servo amplifier 22, motor 23, slip-clutch 25, stop device 26—28, and feedback generator 24 is designated as circuit A. Similarly, I have designated as circuit Y all that portion including synchros 7, 13, 14, amplifier 8, motor 9, and gearings 10, 16, 17. Such designations are made to facilitate the explanation of the present invention as embodied in Figs. 2, 4, 5.

Feedback generator 24 is placed on the transformer side of arm 26 to insure the maintenance of a positive relationship between the output of generator 24 and the position of the rotor of transformer 14. Moreover, while this generator may be of the type having a linear output, it is to be understood that a generator having a non-linear output may be used instead. By using a non-linear feedback generator, I am enabled, within the range permitted by stops 27, 28, to vary the offset of the reference heading in a non-linear manner with respect to the radio-derived displacement signal, whereby the asymptotic entry of the craft into the beam-defined path is modified. That is to say, the generator may be arranged so that through the forepart of the generator's permitted movement, the reference heading is varied more rapidly than would otherwise be the case; and through the remaining portion, the reference heading is varied less rapidly whereby a sharper turn from the intercept heading is called for initially, followed by a wider turn terminally. By this arrangement, I may substantially lessen the possibility of the craft overshooting the beam-defined path upon the interception thereof.

Figure 3:
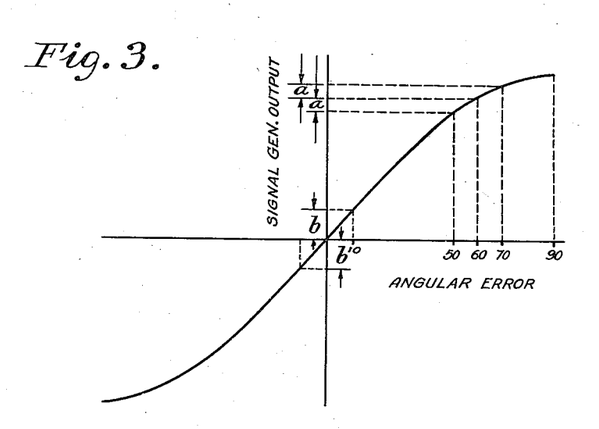
Fig. 3 represents the performance curve of a conventional signal generator such as a selsyn or the like in which the signal voltage output of the signal generator is plotted against the angular error or relative displacement of the rotor and stator from a zero output position.

In prior art navigational aids, a signal voltage output from a selsyn-like signal generator is algebraically added in a summing amplifier to a radio displacement signal, and the craft is made to travel so as to maintain the algebraic sum of the two signals at zero. The signal voltage output of the signal generator varies sinusoidally with the angular error or relative displacement of the rotor and stator from a zero output position. In the case of the heading signal generator, for example, the zero output position of the rotor relative to the stator is the position the rotor occupies when set to the heading of the craft. Hence, when the rotor is set to a reference heading corresponding to the heading of a localizer beam, a signal voltage output may be obtained whose magnitude varies sinusoidally with the angular error or the difference between the heading of the craft and the reference or beam heading. By putting limits on the radio displacement signal input to the summing amplifier, the craft has heretofore been controlled to travel along a substantially straight-line path of interception toward the beam. Hence, during such travel, a signal voltage output has been maintained at the heading signal generator, and the magnitude of such output has depended on the limits given the radio displacement signal. For example, in one case, these limits have been chosen so as to provide an intercept heading making an angle in the neighborhood of 60° to the beam. Thus, 60° is the angular error or the difference between the heading of the craft and the reference or beam heading to be maintained under such conditions. Referring to the plot of angular error versus signal voltage output in Fig. 3, it is seen that a 10° departure, for example, from the 60° angular error to be maintained by the prior art navigational aid gives rise to a relatively slight increase or decrease "a" in signal voltage, due to the sinusoidal nature of the plot. On the other hand, it will be observed that a very much greater increase or decrease "b" would be obtained in signal voltage if such an angular error of 10° were to occur between the craft heading and the reference heading, the latter representing a zero signal output position of the signal generator. This is, in fact, accomplished by the present invention, since the intercept heading, instead of the beam heading, is made to serve as the reference heading or zero signal output position of the signal generator from which angular errors are measured. In other words, any departures of the craft in heading from the intercept heading prescribed by the radio displacement signal will be departures from a zero signal output position of the signal generator or from the 0° angular error axis of Fig. 3. Hence, the nature of the present system is such as to permit any heading that will intercept the beam-defined path, including a heading in excess of 90° to the path, and still provide maximum sensitivity thereabout.

While I have chosen to describe the advantage of increased sensitivity of the present invention in connection with the heading signal developed therein, it will be apparent from the description of other embodiments appearing hereinafter that the same advantage is to be obtained in connection with the roll and pitch signals. That is to say, departures of the craft in roll and pitch from reference roll and pitch attitudes will also be departures about the 0° angular error axis of Fig. 3.

Figure 5:
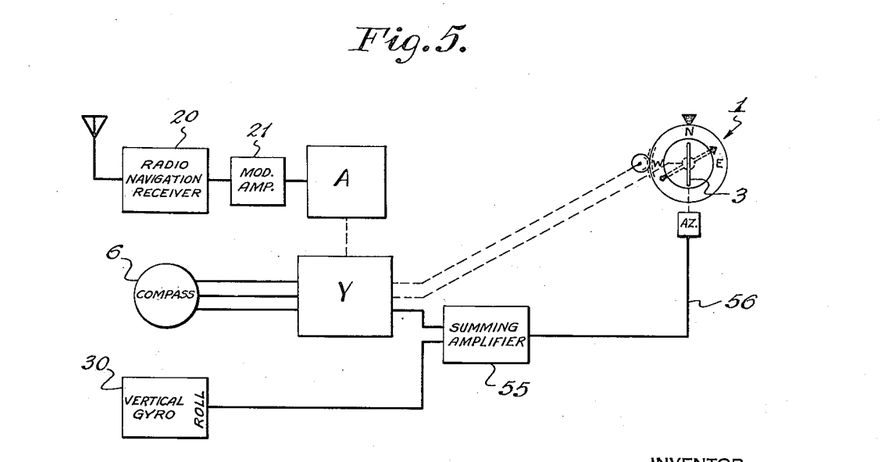
Fig. 5 is an electrical schematic showing my invention embodied in the azimuth control portion of the navigational aid wherein roll and modified heading signals are algebraically added in a summing amplifier.

By the arrangement thus far described, I have provided means to vary the reference value of craft heading or rate of change of radio displacement in accordance with changes in the magnitude of such radio displacement of the craft. As previously noted, my invention contemplates that the rate or heading signal thus operated upon may then be algebraically added in a summing amplifier to an electrical acceleration or roll signal to provide a control signal in controlling relation to the vertical bar 3 of indicator 1. This embodiment is shown in Fig. 5 wherein the signal output from circuit Y (see Fig. 1) is algebraically added in a conventional summing amplifier 55 to the signal output from the roll pickoff of gyroscopic vertical 30, the sum being connected via lead 56 in controlling relation to vertical bar 3 of indicator 1.

In the preferred embodiment shown in Fig. 1, however, instead of algebraically combining the heading and roll signals in a summing amplifier, I provide means whereby the vertical bar is controlled directly by a signal representing craft roll measured from a reference roll attitude which is continuously offset from level by an amount in proportion to the signal obtained from the rotor of control transformer 14. To accomplish this operation, I employ means substantially similar to those hereinabove described for varying the reference value of craft heading in accordance with the displacement of the craft from the beam-defined path.

In this regard, I connect the output of transformer 14 to a servo amplifier 31 forming part of a servo loop which includes a motor 32 connected to be energized in accordance with the output of said amplifier 31 and adapted through a suitable driving connection to drive the rotor of a control transformer 33. Said rotor is electrically connected via a suitable amplifying means 39 to the azimuth coil 40 which controls the deflections of vertical bar 3 of indicator 1, the stator of the transformer being electrically connected to a selsyn-like roll pickoff 29 operated in a well-known manner by a conventional gyroscopic vertical 30. A signal generator 34 also connected to be driven by motor 32 provides a position feedback signal to servo amplifier 31 in a manner hereinbefore recited in describing the operation of signal generator 24.

In order to enable indicator 1 to call for high angles of bank at least for large differences between craft heading and the continuously-changing reference heading, I preferably provide a pair of spaced stops 35, 36 cooperating with a rotatable arm 37 therebetween forming part of the connection between motor 32 and the rotor of transformer 33. A slip-clutch 38 also forms part of said connection and is placed adjacent the motor side of arm 37 whereby stops 35, 36 do not interfere with the normal functioning of motor 32, but limit the rotor of transformer 33 to a given amount of rotation in either direction.

By so limiting the rotation of the rotor of transformer 33, I thereby limit the maximum amount of offset effected upon the reference roll attitude to a value determined by the spacing of stops 35, 36. Hence, whenever the heading signal from transformer 14 is large enough to place arm 37 against one or the other of stops 35, 36, the offset of the reference roll attitude will be at its maximum value, and the signal output of transformer 33 will zero out with the craft at a given roll attitude corresponding to said maximum value of offset. Hence, when the signal from transformer 14 is less than that required for motor 32 to drive arm 37 against a stop, the rotor of transformer 33 is positioned to give a correspondingly decreased amount of offset of the roll reference attitude, and the signal output of transformer 33 will zero out with the craft at a roll attitude less than said given roll attitude and therefore closer to a level attitude. By the same token, no offset occurs when the signal from transformer 14 amounts to zero, therefore, when this condition obtains, the reference attitude will then correspond to said level attitude.

Instead of offsetting the roll reference attitude in the manner just described, I might within the purview of my invention offset such reference attitude in accordance with the output of a summing amplifier employed to algebraically add the radio displacement signal and a signal representing the difference between the heading of the craft and the heading of the radio-defined path. To this end, in Fig. 4 I have shown the displacement signal from radio navigation receiver 20 being fed into a conventional summing amplifier 57 similar to amplifier 55 of Fig. 5. The heading difference signal input is obtained from an arrangement substantially identical to circuit Y of Fig. 1 except that a control transformer 65 is employed in lieu of differential generator 13 and control transformer 14. The stator of transformer 65 is electrically connected to compass 6, and the rotor thereof is both electrically connected to summing amplifier 57 and mechanically connected to be positioned by knob 12. Hence, by adjusting knob 12 for the heading of a localizer beam, a control signal may be obtained from the rotor of transformer 65 dependent upon the difference between the compass and beam headings, as was obtainable from the rotor of transformer 14 (without offset) in Fig. 1.

Figure 4:
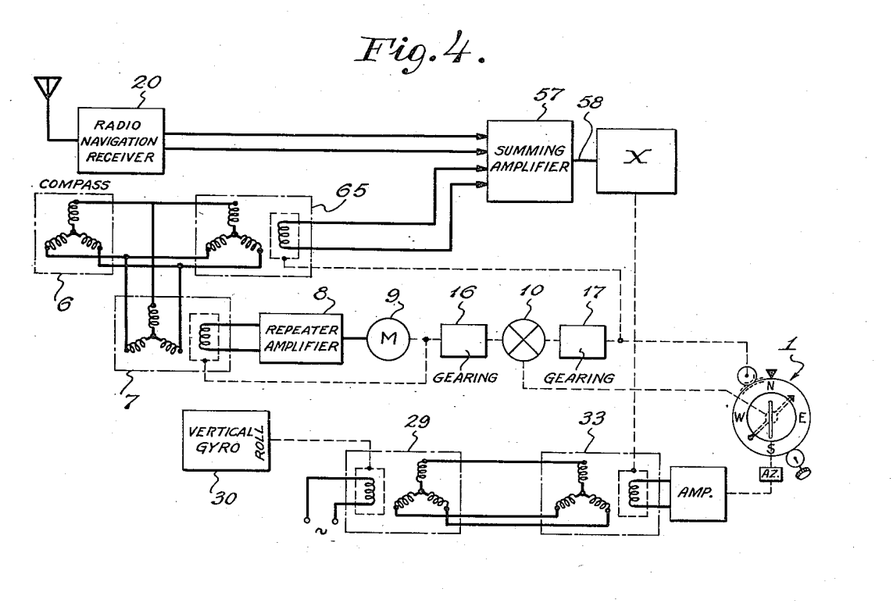
Fig. 4 is an electrical schematic showing my invention embodied in the azimuth control portion of the navigational aid wherein heading and radio displacement signals are algebraically added in a summing amplifier.

The signal output of amplifier 57, representing the algebraic sum of the radio displacement and heading difference signals, is connected via lead 58 to circuit X, which is the same as that portion of Fig. 1 containing amplifier 31, motor 32, clutch 38, stops 35—37, and generator 34. The mechanical output of circuit X is connected to drive the rotor of control transformer 33 as in Fig. 1, and the roll reference attitude is thereby offset in accordance with the algebraic sum of the radio displacement signal and said heading difference signal.

In order to control the horizontal bar 2 or elevation portion of indicator 1, I have preferably substantially adopted the arrangement set forth in the aforementioned Serial No. 128,227. Accordingly, when flying toward a radio-defined path, I close a switch 43 to connect a source 41 of alternating current signal proportional to craft altitude via a limiting amplifier 42 to a summing amplifier 48 wherein said altitude signal is algebraically added to a signal proportional to the departure of the craft from a reference pitch attitude. The pitch signal is obtained from a data transmission arrangement including a selsyn generator 49 serving as a pickoff on the pitch axis of gyroscopic vertical 30 and further including a selsyn control transformer 50 electrically connected to generator 49 and adapted to supply said pitch signal to the summing amplifier, the output of the latter being connected in controlling relation to the elevation coil 51 operating horizontal bar 2 of the indicator. When, however, the craft is on the localizer-defined path, a switch 46 is closed to substitute a glide slope displacement signal for the altitude signal previously added to the gyroscopically-derived pitch signal. The glide slope signal is derived from a standard glide slope receiver 44 and fed via a modulator 45 to limiting amplifier 42. A pitch trim knob 52 is connected to the rotor of control transformer 50 for offsetting the reference pitch attitude a fixed amount in accordance with the slope of the glide path and the aircraft characteristics when switch 46 is operated. Moreover, switches 43, 46 are preferably ganged and operable by a three-position knob 47 so that both switches may be opened simultaneously, and to insure that when one switch is closed, the other switch is on a dead contact.

While the signal for controlling the craft in the vertical plane is preferably obtained in the manner set forth in said Serial No. 128,227, it is to be understood that a reference offset arrangement substantially similar to that hereinabove described for controlling the craft in its horizontal plane may be readily employed. In this regard, reference should be had to Fig. 2 which shows an arrangement by which either the radio displacement signal derived from glide slope receiver 44 or the altitude displacement signal derived from altitude control 41 may be fed to circuit A (see Fig. 1) depending on the position of knob 47 controlling switches 43, 46. The mechanical output of circuit A is connected to drive the rotor of a control transformer 60. Said rotor is electrically connected via a suitable amplifying means 61 to elevation coil 51 which controls the deflections of horizontal bar 2 of indicator 1, the stator of the transformer being electrically connected to the stator of pitch pickoff 49. By driving the rotor of control transformer 60 as set forth, I continuously offset the reference value against which the pitch signal is measured in accordance with either one or the other of the glide slope and altitude signals. The fixed amount of offset required for glide-slope operation may be provided by a pitch trim knob 62 adapted by suitable mechanical means to rotate the stator of control transformer 60.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. In a navigational aid for dirigible craft, means including a localizer receiver for providing a first signal proportional to the displacement of the craft laterally of a localizer-defined path, a heading reference device including means for supplying a second signal of reversible sign and having a magnitude variable in accordance with deviations of the craft from the reference heading, means responsive to said first signal for offsetting the heading reference from a preselected index value in an amount proportional to the magnitude of said first signal such that the second signal represents deviations in heading of the craft from the offset heading reference, said second signal being substantially zero when the craft heading corresponds to the offset reference heading, and limiting means for rendering said signal responsive means incapable of offsetting the heading reference in excess of a given amount from said preselected index value so that when said second signal is maintained substantially at a zero value, the craft will travel in a substantially straight line toward said localizer-defined path until the offset diminishes from said given amount thereof, whereupon said craft will thereafter travel along a path asymptotically intercepting said localizer-defined path.

2. In a navigational aid for controlling a dirigible craft to travel toward and ultimately pursue given flight path, means for providing a first signal dependent on the lateral displacement of the craft from said flight path, a first attitude reference device including means for supplying a second signal proportional to deviations in attitude of the craft from the attitude of said flight path, means for algebraically adding said first and second signals to provide a third signal proportional to the algebraic sum of said first and second signals, a second attitude reference device including means for supplying a fourth signal of reversible sign and variable magnitude proportional in magnitude to deviations of the craft from a second reference attitude, means responsive to said third signal for offsetting the second attitude reference from a preselected position in an amount proportional to said third signal such that the fourth signal represents deviations in attitude of the craft from the offset second attitude reference, said fourth signal being substantially zero when the craft attitude corresponds to the offset second reference attitude, whereby when said fourth signal is maintained substantially at a zero value the craft will travel along a path asymptotically intercepting said flight path.

3. In a navigational aid for dirigible craft, means including a localizer reeciver for providing a first signal proportional to the displacement of the craft laterally of a localizer-defined path, a heading reference device including means for supplying a second signal proportional to deviation of the craft from the reference heading, summing means connected to receive said first and second signals and adapted to provide a third signal proportional to the algebraic sum of said first and second signals, a roll reference device including means for supplying a fourth signal of reversible sign and variable magnitude, said variable magnitude being in proportion to deviations of the craft from the reference roll attitude, means responsive to said third signal for offsetting the roll reference from a preselected index value in an amount proportional to said third signal such that the fourth signal represents deviations in roll of the craft from the offset reference roll attitude, said fourth signal being substantially zero when the roll attitude of the craft corresponds to the offset reference roll attitude, whereby when said fourth signal is maintained substantially at a zero value, the craft will travel along a path asymptotically intercepting said localizer-defined path.

4. In a navigational aid for dirigible craft, means including a localizer receiver for providing a first signal proportional to the displacement of the craft laterally of a localizer-defined path, a heading reference device including means for supplying a second signal of reversible sign and having a magnitude variable in accordance with deviations of the craft from the reference heading, said reference heading normally being the heading of said localizer-defined path, means responsive to said first signal for offsetting the heading reference from its normal value in an amount proportional to the magnitude of said first signal such that the second signal represents deviations in heading of the craft from the offset heading reference, said second signal being substantially zero when the craft heading corresponds to the offset reference heading, a roll reference device including means for supplying a third signal of reversible sign and having a magnitude variable in accordance with deviations of the craft from the reference roll attitude, means responsive to said second signal for offsetting the roll reference from a preselected index value in an amount proportional to the magnitude of said second signal such that the third signal represents deviations in roll of the craft from the offset reference roll attitude, said third signal being substantially zero when the roll attitude of the craft corresponds to the offset reference roll attitude, whereby when said third signal is maintained substantially at a zero value, the craft will travel along a path asymptotically intercepting said localizer-defined path.

5. In a navigational aid for dirigible craft, an altitude reference device including means for providing a first signal proportional to the displacement of the craft laterally from a reference altitude, means including a glide slope receiver for providing a second signal proportional to the displacement of the craft vertically of a radio-defined glide path, a pitch reference device including means for supplying a third signal of reversible sign and of a magnitude variable in accordance with deviations of the craft from the reference pitch attitude, means responsive to one of the first and second signals for offsetting the pitch reference from a preselected index value in an amount proportional to the magnitude of said one of the first and second signals such that the third signal represents deviations in pitch of the craft from the offset pitch reference, said third signal being substantially zero when the craft pitch attitude corresponds to the offset reference pitch attitude, and limiting means for rendering said signal responsive means incapable of offsetting said pitch reference in excess of a given amount from said preselected index value so that if said craft is controlled to null out said third signal, said craft will intercept one of said reference altitude and said glide path, the craft's approach course being in a straight line until said offset diminishes from said given amount thereof, said course thereafter being asymptotic to the point of interception.

6. In a navigational aid for dirigible craft, an altitude reference device including means for providing a first signal proportional to the displacement of the craft from a reference altitude, a pitch reference device including means for supplying a second signal of reversible sign and of a magnitude variable in accordance with deviations of the craft from the reference pitch attitude, means responsive to said first signal for offsetting the pitch reference from a preselected index value in an amount proportional to the magnitude of said first signal such that the second signal represents deviations in pitch of the craft from the offset pitch reference, said second signal being substantially zero when the craft pitch attitude corresponds to the offset reference pitch attitude, and limiting means for rendering said signal responsive means incapable of offsetting said pitch reference in excess of a given amount from said preselected index value so that if said craft is controlled to null out said second signal, said craft will travel in a straight line toward said reference altitude until the offset diminishes from said given amount thereof, said craft thereafter traveling along a path asymptotically intercepting the level of said reference altitude.

7. In a navigational aid for controlling an aircraft to travel toward and ultimately pursue a flight path of a given attitude, means defining a reference attitude normally coincident with the attitude of said flight path, means including a signal generator for providing a control signal dependent on the attitude of said craft relative to said reference attitude, means for offsetting said reference attitude by an angular amount in proportion to the lateral displacement of said craft from said flight path, and means for limiting the angular amount through which said reference attitude may be offset, whereby said control signal calls for the craft to fly a straight line course toward said flight path until said lateral displacement becomes insufficient to hold said offset at the limited amount thereof, said signal thereafter calling for an asymptotic interception of said flight path by said craft.

8. In a navigational aid for dirigible craft, means defining a flight path to be intercepted and followed by said craft, means for providing a first signal dependent on the lateral displacement of the craft from said flight path, an attitude reference device including means for supplying a second signal of reversible sign and variable magnitude proportional to deviations of the craft from the reference attitude, means responsive to said first signal for offsetting the attitude reference from a preselected position in an amount proportional to the magnitude of said first signal, the second signal thereby repersenting deviations in attitude of the craft from the offset attitude reference and being substantially zero when the craft attitude corresponds to the offset reference attitude, and limiting means for rendering said signal responsive means incapable of offsetting the attitude reference in excess of a given amount from said preselected position so that when said second signal is maintained substantially at a zero value, the craft will travel in a susbtantially straight line toward said flight path until the offset diminishes from said given amount thereof permitted by said limiting means, whereupon said craft will thereafter travel along a path asymptotically intercepting said flight path.

9. In a navigational aid for controlling a dirigible craft to travel toward and ultimately pursue a given flight path, means for providing a first signal dependent on the lateral displacement of the craft from said flight path, a first attitude reference device including means for supplying a second signal proportional to deviations in attitude of the craft from the attitude of said flight path, means for combining said first and second signals to provide a third signal proportional to the algebraic sum of said first and second signals, a second attitude reference device including means for supplying a fourth signal of reversible sign and variable magnitude proportional to deviations of the craft from a second reference attitude, means responsive to said third signal for offsetting the second attitude reference from a preselected position in an amount proportional to said third signal so that the fourth signal represents deviations in attitude of the craft from the offset second attitude reference, said fourth signal being substantially zero when the craft attitude corresponds to the offset second reference attitude, and limiting means for rendering said signal responsive means incapable of offsetting said second attitude reference in excess of a given amount from said preselected position so that when said fourth signal is maintained substantially at a zero value, the craft will travel in a substantially straight line toward said flight path until the offset diminishes from said given amount thereof, whereupon said craft will thereafter travel along a path asymptotically intercepting said flight path.

10. In a navigational aid for dirigible craft, means including a localizer receiver for providing a first signal proportional to the displacement of the craft laterally of a localizer-defined path, a heading reference device including means for supplying a second signal proportional to deviation of the craft from the reference heading, summing means connected to receive said first and second signals and adapted to provide a third signal proportional to the algebraic sum of said first and second signals, a roll reference device including means for supplying a fourth signal of reversible sign and variable magnitude, said variable magnitude being in proportion to deviations of the craft from the reference roll attitude, means responsive to said third signal for offsetting the roll reference from a preselected index value in an amount proportional to said third signal so that the fourth signal represents deviations in roll of the craft from the offset reference roll attitude, said fourth signal being substantially zero when the roll attitude of the craft corresponds to the offset reference roll attitude, and limiting means for rendering said signal responsive means incapable of offsetting said roll reference in excess of a given amount from said preselected index value so that when said fourth signal is maintained substantially at a zero value, the craft will travel in a substantially straight line toward said localizer-defined path until the offset diminishes from said given amount thereof, whereupon said craft will thereafter travel along a path asymptotically intercepting said localizer-defined path.

11. In a navigational aid for dirigible craft, means including a localizer receiver for providing a first signal proportional to the displacement of the craft laterally of a localizer-defined path, a heading reference device including means for supplying a second signal of reversible sign and having a magnitude variable in accordance with deviations of the craft from the reference heading, said reference heading normally being the heading of said localizer-defined path, means responsive to said first signal for offsetting the heading reference from its normal value in an amount proportional to the magnitude of said first signal so that the second signal represents deviations in heading of the craft from the offset heading reference, said second signal being substantially zero when the craft heading corresponds to the offset reference heading, first limiting means for rendering said first signal responsive means incapable of offsetting said heading reference in excess of a first given amount from said normal value thereof, a roll reference device including means for supplying a third signal of reversible sign and having a magnitude variable in accordance with deviations of the craft from the reference roll attitude, means responsive to said second signal for offsetting the roll reference from a preselected index value in an amount proportional to the magnitude of said second signal so that the third signal represents deviations in roll of the craft from the offset reference roll attitude, said third signal being substantially zero when the roll attitude of the craft corresponds to the offset reference roll attitude, and second limiting means for rendering said second signal responsive means incapable of offsetting said roll reference in excess of a second given amount from said preselected index value thereof so that when said third signal is maintained at zero, the craft will travel toward said localizer-defined path with a fixed heading attitude until said heading reference offset diminishes from said first given amount and with a fixed roll attitude until said roll reference offset diminishes from said second given amount, whereupon the roll attitude of the craft will thereafter gradually become equal to said index value thereof while the craft travels along a path asymptotically intercepting said localizer-defined path.

References Cited in the file of this patent

UNITED STATES PATENTS

| 2,296,041 | Luck | Sept. 15, 1942 |
| 2,429,642 | Newton | Oct. 28, 1947 |
| 2,474,618 | Divoll | June 28, 1949 |
| 2,496,809 | Moseley | Feb. 7, 1950 |
| 2,561,873 | Kutzler | July 24, 1951 |
| 2,612,638 | Pine | Sept. 30, 1952 |
| 2,632,135 | Carpenter | Mar. 17, 1953 |

FOREIGN PATENTS

| 516,567 | Great Britain | Jan. 5, 1940 |
| 444,314 | Italy | Jan. 20, 1949 |
| 983,219 | France | Feb. 7, 1951 |

UNITED STATES PATENT OFFICE

CERTIFICATE OF CORRECTION

Patent No. 2,834,957                                          May 13, 1958

Spencer Kellogg 2nd

It is hereby certified that error appears in the printed specification of the above numbered patent requiring correction and that the said Letters Patent should read as corrected below.

Column 3, line 42, for "handling" read -- heading --; column 10, line 50, for "reeciver" read -- receiver --; column 12, line 26, for "repersenting" read -- representing --.

Signed and sealed this 14th day of April 1959.

(SEAL)
Attest:

KARL H. AXLINE                                          ROBERT C. WATSON

Attesting Officer                                   Commissioner of Patents